United States Patent
Parziale et al.

(10) Patent No.: US 11,720,295 B2
(45) Date of Patent: Aug. 8, 2023

(54) SYSTEM AND METHOD FOR TRANSFORMING ENTITY DEVICE TO A MULTI-FUNCTIONAL DEVICE VIA A REMOTE COMMUNICATION LINK

(71) Applicant: BANK OF AMERICA CORPORATION, Charlotte, NC (US)

(72) Inventors: Carl Parziale, Charlotte, NC (US); James Alexander, Dripping Springs, TX (US); Elizabeth Anne Price, Newport, TN (US); David Smiddy, Chadds Ford, PA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 17/398,691

(22) Filed: Aug. 10, 2021

(65) Prior Publication Data
US 2023/0052400 A1  Feb. 16, 2023

(51) Int. Cl.
*G06F 15/00* (2006.01)
*G06F 3/12* (2006.01)

(52) U.S. Cl.
CPC .......... *G06F 3/1206* (2013.01); *G06F 3/1224* (2013.01); *G06F 3/1236* (2013.01)

(58) Field of Classification Search
CPC ..... G06F 3/1206; G06F 3/1224; G06F 3/1236
USPC ........................................................ 358/1.13
See application file for complete search history.

(56) References Cited

U.S. PATENT DOCUMENTS

| | | | |
|---|---|---|---|
| 7,654,450 B2 | 2/2010 | Mateen et al. | |
| 8,282,001 B2 | 10/2012 | Snyder et al. | |
| 8,316,237 B1 | 11/2012 | Felsher et al. | |
| 8,640,946 B1 | 2/2014 | Block et al. | |
| 8,955,743 B1 | 2/2015 | Block et al. | |
| 8,971,932 B2 | 3/2015 | Mapes | |
| 9,560,203 B2 | 1/2017 | Kay et al. | |
| 9,607,483 B2 | 3/2017 | Block et al. | |
| 9,679,278 B2 | 6/2017 | Drummond et al. | |
| 9,767,422 B2 | 9/2017 | Ray et al. | |
| 9,916,736 B2 | 3/2018 | Block et al. | |
| 10,313,635 B2 | 6/2019 | Paliga et al. | |
| 10,438,455 B2 | 10/2019 | Konecny et al. | |
| 10,504,123 B2 | 12/2019 | Joao | |
| 10,681,044 B1 | 6/2020 | Storm et al. | |
| 11,188,637 B1* | 11/2021 | Lawson ................. | G06N 7/005 |
| 11,354,632 B1 | 6/2022 | Hill et al. | |
| 2004/0164141 A1 | 8/2004 | Egami et al. | |

(Continued)

*Primary Examiner* — Mark R Milia
(74) *Attorney, Agent, or Firm* — Moore & Van Allen PLLC; Nicholas C. Russell (57) ABSTRACT

Embodiments of the present invention provide a system for transforming entity device to a multi-functional device via a remote communication link. In particular, the system may be configured to receive an interaction request from an associate, via an associate device, wherein the interaction request is associated with a user, authenticate the associate using the associate device, in response to authenticating the associate, establish a remote communication link between the associate device and an entity device, receive an activation request from the associate to activate the entity device, via the associate device and the remote communication link, and in response to receiving the activation request, activate the entity device and transform the entity device to a multi-functional device.

17 Claims, 6 Drawing Sheets

(56) References Cited

U.S. PATENT DOCUMENTS

| | | |
|---|---|---|
| 2009/0201372 A1 | 8/2009 | O'Doherty et al. |
| 2016/0012411 A1* | 1/2016 | Kursun et al. |
| 2017/0140563 A1* | 5/2017 | No .................. H04N 1/00167 |
| 2017/0178626 A1 | 6/2017 | Gruber et al. |
| 2019/0347632 A1 | 11/2019 | Lucas et al. |
| 2020/0005262 A1 | 1/2020 | Arora et al. |
| 2020/0137230 A1 | 4/2020 | Spohrer |
| 2021/0192484 A1 | 6/2021 | Forutanpour et al. |
| 2022/0351275 A1 | 11/2022 | Zhou et al. |
| 2022/0385656 A1 | 12/2022 | Gujarathi |

* cited by examiner

SYSTEM AND METHOD FOR TRANSFORMING ENTITY DEVICE TO A MULTI-FUNCTIONAL DEVICE VIA A REMOTE COMMUNICATION LINK

BACKGROUND

Current entity devices are limited to performing certain type of interactions with one or more users. As such, there exists a need for a system to transform entity devices to a multi-functional device via a remote communication link.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for transforming entity device to a multi-functional device via a remote communication link. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention receives an interaction request from an associate, via an associate device, wherein the interaction request is associated with a user, authenticates the associate using the associate device, in response to authenticating the associate, establishes a remote communication link between the associate device and an entity device, receives an activation request from the associate to activate the entity device, via the associate device and the remote communication link, and in response to receiving the activation request, activates the entity device and transform the entity device to a multi-functional device.

In some embodiments, the present invention transforms the entity device to the multi-functional device to process the interaction request.

In some embodiments, the interaction request is associated with disbursement of special resources. In some embodiments, the present invention In some embodiments, the present invention processes the interaction request based on causing a control system of the entity device to activate a special resource module of the entity device and extract the special resources associated with the interaction request and causing the control system of the entity device to activate the special resource dispenser of the entity device to dispense the special resources associated with the interaction request.

In some embodiments, the present invention causes the control system of the entity device to activate a printing module of the entity device to perform a printing operation on the special resources extracted from the special resource module.

In some embodiments, the present invention generates a scannable code and display the scannable code on the entity device, wherein the scannable code allows the user to initiate the establishment of the remote communication link between the associate device and the entity device.

In some embodiments, the present invention activates the entity device and transforms the entity device to the multi-functional device by transmitting a network packet to the entity device.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, the term "resource entity" or "entity" may be any institution which involves in financial transactions. In one embodiment, the term "entity" or "resource entity" may be any financial institution. As used herein, the term "entity device" may be any device associated with the entity. In some embodiments of the present invention, the entity device may be an automated machine. In some embodiments, the "automated machine" may be any automated device that is involved in distribution of resources such as cash, checks, electronic transfers, money orders or the like. In one embodiment of the present invention, the automated machine may be an improved Automated Teller Machine (ATM). In some embodiments, the "automated machine" may be any automated device that provides information associated with resource pools of the user. In some embodiments, the automated machine may be owned and/or controlled by the resource entity.

As described herein, a "user" may be a customer or a potential customer of the entity. In some embodiments, a "user" may be a financial institution customer (e.g., an account holder or a person who has an account (e.g., banking account, credit account, or the like)). An "account" or "resource pool" may be the relationship that the customer has with the financial institution. Examples of accounts include a deposit account, such as a transactional account (e.g. a banking account), a savings account, an investment account, a money market account, a time deposit, a demand deposit, a pre-paid account, a credit account, a non-monetary customer information that includes only personal information associated with the customer, or the like. The account is associated with and/or maintained by a financial institution.

A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user or to output data to a user. These input and output devices may include a display, mouse, keyboard, button, touchpad, touch screen, microphone, speaker, LED, light, joystick, switch, buzzer, bell, and/or other user input/output device for communicating with one or more users.

Conventional entity devices typically provide standard resources (e.g., cash) to one or more users associated with an entity. For all other kinds of interactions, the users typically have to go to into a financial center and interact with multiple associates to perform the interactions. As such, conventional entity devices are not capable of allowing the one or more users to perform non-standard interactions. Therefore, there exists a need for a system that transforms entity devices (e.g., ATM) to allow the one or more users to perform the non-standard interactions. The system of the present invention solves this problem by transforming the entity devices to multi-functional devices via a remote communication link.

Figure 1:
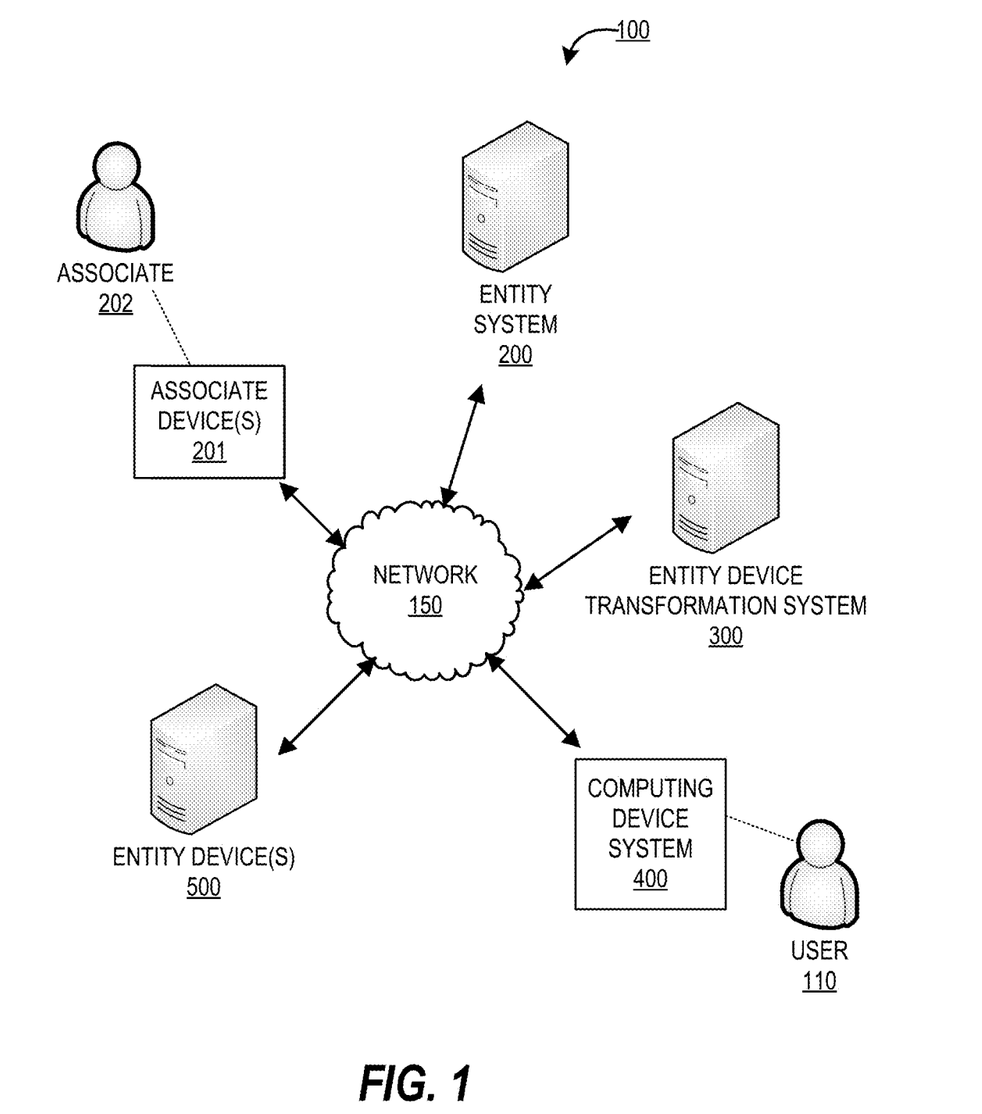
FIG. 1 provides a block diagram illustrating a system environment for transforming entity device to a multi-functional device via a remote communication link, in accordance with an embodiment of the invention.

FIG. 1 provides a block diagram illustrating a system environment 100 for transforming entity device to a multi-functional device via a remote communication link, in accordance with an embodiment of the invention. As illustrated in FIG. 1, the environment 100 includes an entity device transformation system 300, entity system 200, one or more associate devices 201, one or more entity devices 500, and a computing device system 400. One or more users 110 may be included in the system environment 100, where the users 110 interact with the other entities of the system environment 100 via a user interface of the computing device system 400. In some embodiments, the one or more user(s) 110 of the system environment 100 may be customers of an entity associated with the entity system 200. In some embodiments, the one or more users 110 may be customers of other entities. In some embodiments, the one or more users 110 may be potential customers of the entity associated with the entity system 200. One or more associates 202 may be included in the system environment 100, where the one or more associates 202 interact with the other entities of the system environment 100 via a user interface of the one or more associate devices 201. In some embodiments, the one or more associates 202 of the system environment 100 may be employees (e.g., full-time employees, part-time employees, contractors, sub-contractors, or the like) of the entity associated with the entity system 200.

The entity system(s) 200 may be any system owned or otherwise controlled by an entity to support or perform one or more process steps described herein. In some embodiments, the entity is a financial institution. In some embodiments, the one or more entity devices 500 may be owned, operated, controlled, and/or maintained by the entity. Examples of the one or more entity devices 500 may include, but are not limited to, Automated Teller Machines, automated kiosks, or the like that allow the one or more users 110 to access information associated with one or more resource pools of the user or to perform one or more resource interactions associated with the one or more resource pools of the user. In a preferred embodiment of the present invention, the entity device 200 may be an Automated Teller Machine. In some embodiments, the one or more associate devices 201 may be owned, operated, controlled, and/or maintained by the entity. Examples of one or more associate devices 201 may include, but are not limited to, wireless devices (e.g., wireless tablets), or the like that allow the one or more associates 202 to perform one or more tasks associated with the one or more resource interactions of the one or more users 110 and/or any other actions associated with organizational activities associated with the entity (e.g., inputting information, or the like). In some embodiments, the one or more associate devices 201 may have similar components as that of computing device systems 400 described in FIG. 4, but may be configured to perform specific processing steps as described in FIG. 6 below.

The entity device transformation system 300 is a system of the present invention for performing one or more process steps described herein. In some embodiments, the entity device transformation system 300 may be an independent system. In some embodiments, the entity device transformation system 300 may be a part of the entity system 200.

The entity device transformation system 300, the entity system 200, the entity device 500, the one or more associates devices 201, and the computing device system 400 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the entity device transformation system 300 is configured to communicate information or instructions with the entity system 200, and/or the computing device system 400 across the network 150.

The computing device system 400 may be a system owned or controlled by the entity of the entity system 200 and/or the user 110. As such, the computing device system 400 may be a computing device of the user 110. In general, the computing device system 400 communicates with the user 110 via a user interface of the computing device system 400, and in turn is configured to communicate information or instructions with the entity device transformation system 300, and/or entity system 200 across the network 150. In some embodiments of the invention, the computing device system 400 may be a mobile device.

Figure 2:
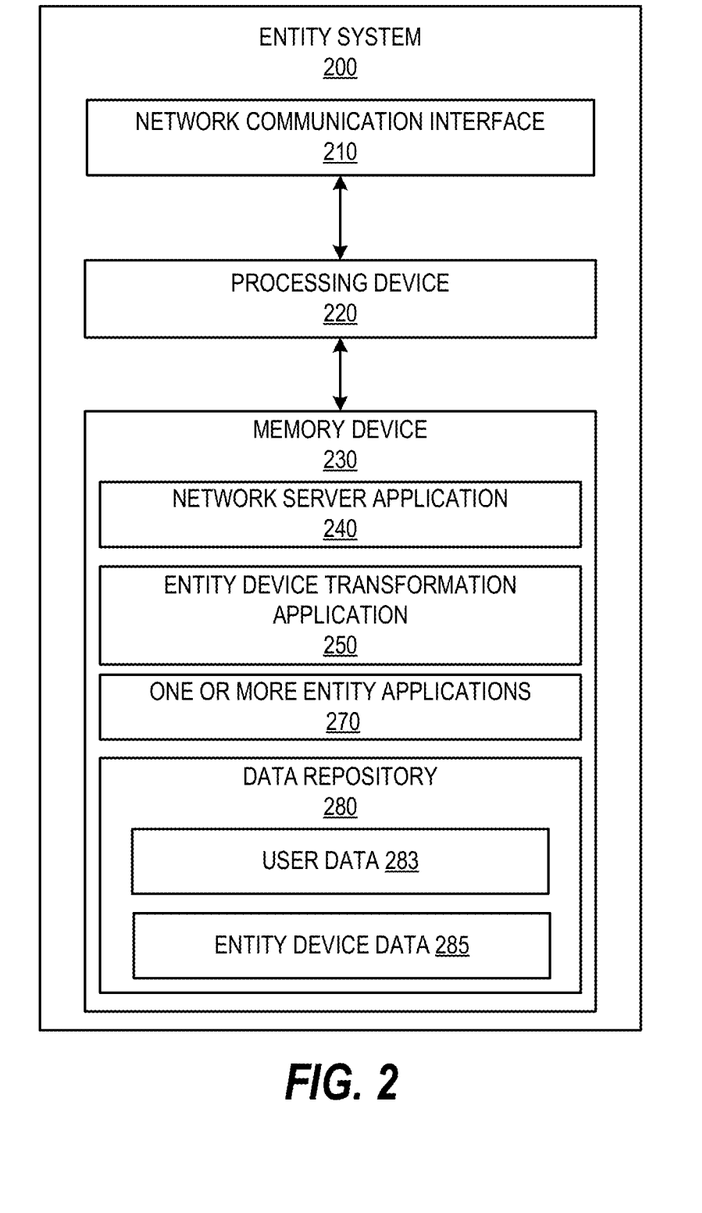
FIG. 2 provides a block diagram illustrating the entity system 200 of FIG. 1, in accordance with an embodiment of the invention.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by a first entity, such as a financial institution, while in other embodiments, the entity system 200 is operated by an entity other than a financial institution.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, an entity device transformation application 250, one or more entity applications 270, and a data repository 280 comprising user data 283 and entity device data 285, where the user data 283 comprises data associated with users 110 and/or one or more resource pools associated with the users 110 and the entity device data 285 comprises data associated with one or more entity devices. The one or more entity applications 270 may be any applications provided by the entity that allows users 110 and/or one or more associates 202 to access information and/or perform one or more actions associated with one or more resource pools of the users 110, or the like. The computer-executable program code of the network server application 240, the entity device transformation application 250, the one or more entity application 270 to perform certain logic, data-extraction, and data-storing functions of the entity system 200 described herein, as well as communication functions of the entity system 200.

The network server application 240, the entity device transformation application 250, and the one or more entity applications 270 are configured to store data in the data repository 280 or to use the data stored in the data repository 280 when communicating through the network communication interface 210 with the entity device transformation system 300, and/or the computing device system 400 to perform one or more process steps described herein. In some embodiments, the entity system 200 may receive instructions from the entity device transformation system 300 via the entity device transformation application 250 to perform certain operations. The entity device transformation application 250 may be provided by the entity device transformation system 300.

Figure 3:
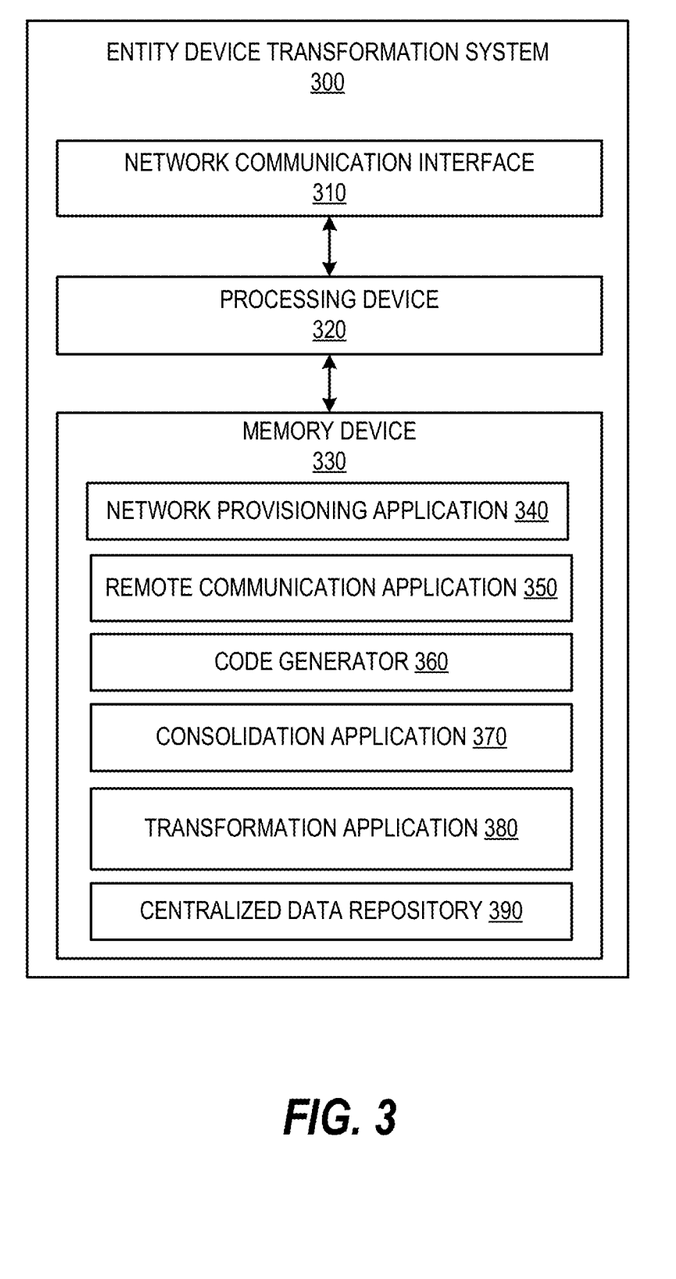
FIG. 3 provides a block diagram illustrating an entity device transformation system 300 of FIG. 1, in accordance with an embodiment of the invention.

FIG. 3 provides a block diagram illustrating the entity device transformation system 300 in greater detail, in accordance with embodiments of the invention. As illustrated in FIG. 3, in one embodiment of the invention, the entity device transformation system 300 includes one or more processing devices 320 operatively coupled to a network communication interface 310 and a memory device 330. In certain embodiments, the entity device transformation system 300 is operated by a first entity, such as a financial institution, while in other embodiments, the entity device transformation system 300 is operated by an entity other than a financial institution. In some embodiments, the entity device transformation system 300 is owned or operated by the entity of the entity system 200. In some embodiments, the entity device transformation system 300 may be an independent system. In alternate embodiments, the entity device transformation system 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the entity device transformation system 300 described herein. For example, in one embodiment of the entity device transformation system 300, the memory device 330 includes, but is not limited to, a network provisioning application 340, a remote communication application 350, a code generator 360, a consolidation application 370, a transformation application 380, and a centralized data repository 390 comprising data processed or accessed by one or more applications in the memory device 330. The computer-executable program code of the network provisioning application 340, the remote communication application 350, the code generator 360, the consolidation application 370, and the transformation application 380 may instruct the processing device 320 to perform certain logic, data-processing, and data-storing functions of the entity device transformation system 300 described herein, as well as communication functions of the entity device transformation system 300.

The network provisioning application 340, the remote communication application 350, the code generator 360, the consolidation application 370, and the transformation application 380 are configured to invoke or use the data in the data repository 390 when communicating through the network communication interface 310 with the entity system 200, and/or the computing device system 400. In some embodiments, the network provisioning application 340, the remote communication application 350, the code generator 360, the consolidation application 370, and the transformation application 380 may store the data extracted or received from the entity system 200, and the computing device system 400 in the centralized data repository 390. In some embodiments, the network provisioning application 340, the remote communication application 350, the code generator 360, the consolidation application 370, and the transformation application 380 may be a part of a single application. The functionalities of the network provisioning application 340, the remote communication application 350, the code generator 360, the consolidation application 370, and the transformation application 380 are explained in greater detail in FIG. 6.

Figure 4:
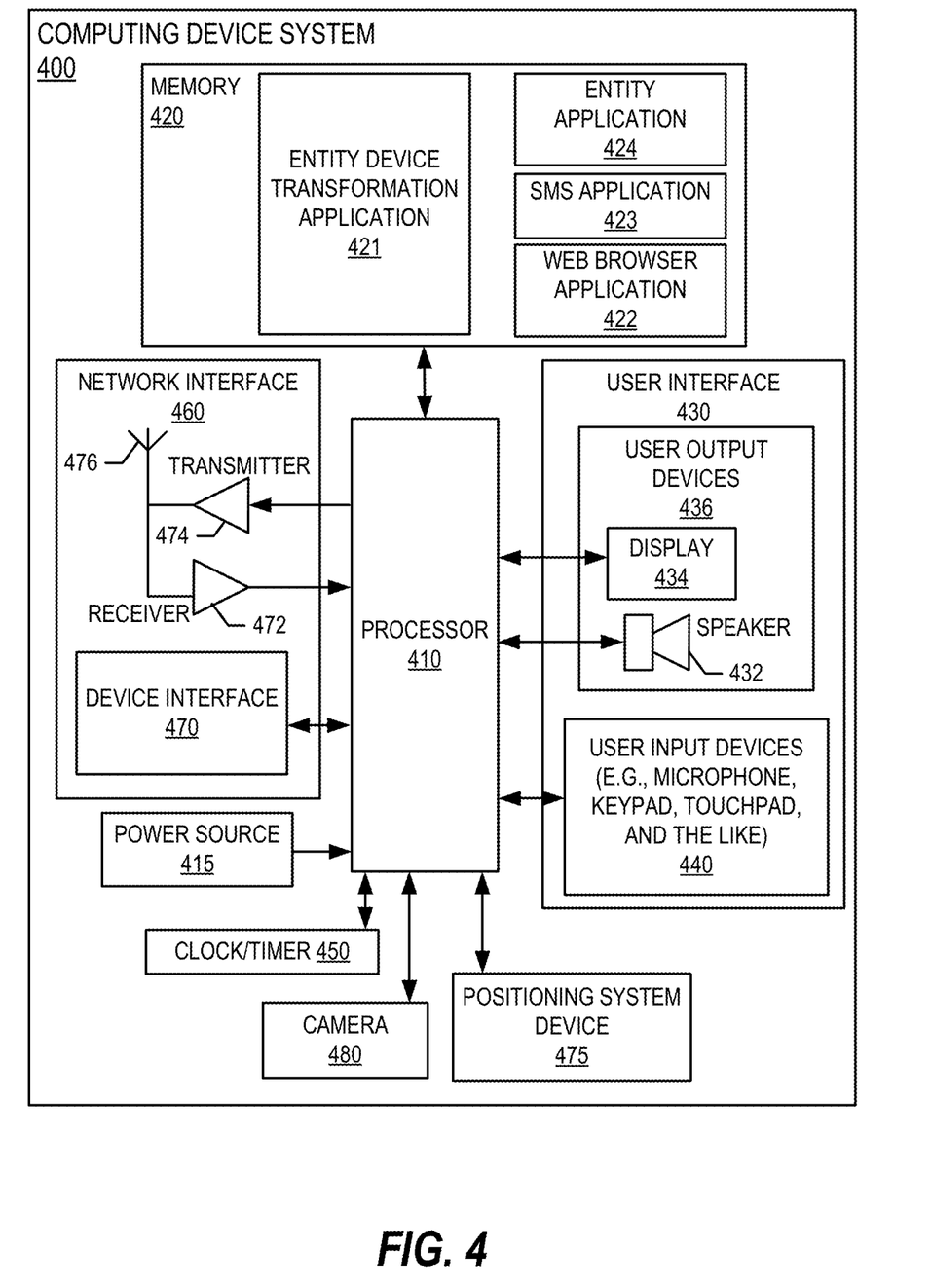
FIG. 4 provides a block diagram illustrating the computing device system 400 of FIG. 1, in accordance with an embodiment of the invention.

FIG. 4 provides a block diagram illustrating a computing device system 400 of FIG. 1 in more detail, in accordance with embodiments of the invention. However, it should be understood that a mobile telephone is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a device interface 470, a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like.

As described above, the computing device system 400 has a user interface that is, like other user interfaces described herein, made up of user output devices 436 and/or user input devices 440. The user output devices 436 include a display 434 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touch-pad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, an entity device transformation application 421, entity application 424, an SMS application 423, or the like. In some embodiments, the entity application 424 may be an online banking application. The entity device transformation application 421 may comprise instructions to a graphical user interface (GUI) on the display 430 that allows the user 110 to interact with the entity system 200, the entity device transformation system 300, and/or other devices or systems. The memory 420 of the computing device system 400 may comprise a Short Message Service (SMS) application 423 configured to send, receive, and store data, information, communications, alerts, and the like via the wireless telephone network 152. In some embodiments, the entity device transformation application 421 provided by the entity device transformation system 300 allows the user 110 to access the entity device transformation system 300. In some embodiments, the entity application 424 provided by the entity system 200 and the entity device transformation application 421 allow the user 110 to access the functionalities provided by the entity device transformation system 300 and the entity system 200. In some embodiments, the entity application 424 may be an online banking application.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

Figure 5:
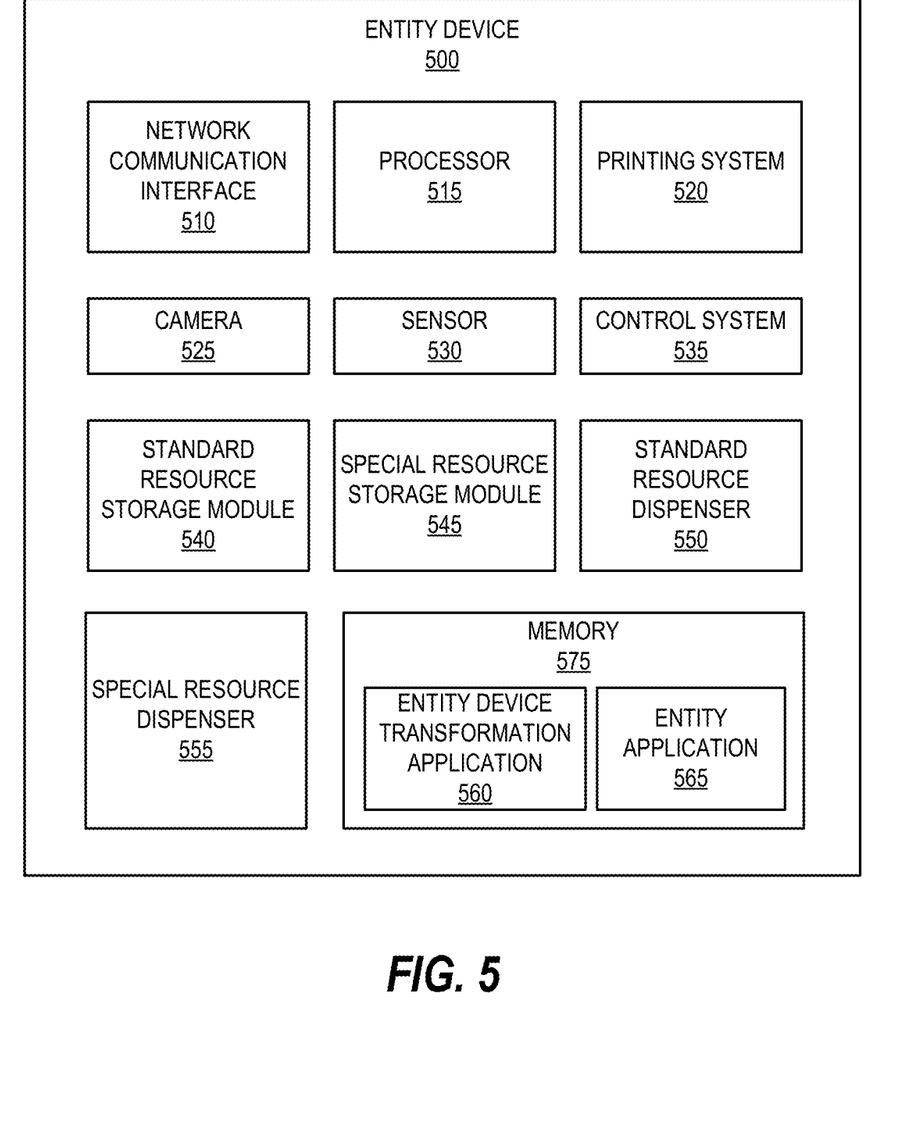
FIG. 5 provides a block diagram illustrating the entity device 500 of FIG. 1, in accordance with an embodiment of the invention.

FIG. 5 provides a block diagram of the entity device 500, in accordance with an embodiment of the present invention. In some embodiments, the entity device 500 may be a resource distribution device that distributes standard resources (e.g., cash), special resources (e.g., coins, cashier's check, money order, foreign currency), or the like. As illustrated in FIG. 5, in one embodiment of the invention, the entity device 500 includes a processor 515 operatively coupled to a network communication interface 510, a memory component 575, a printing system 520, a camera 525, a sensor 530, a control system 535, a standard resource storage module 540, a special resource storage module 545, a standard resource dispenser 550, a special resource dispenser 555, or the like. The resource distribution device may include other components such as a display, a speaker, resource acceptor which can accept resources from a user using the entity device 500, or the like.

The memory 575 may comprise an entity device transformation application 560 provided by the entity device transformation system 500, an entity application 565 provided by the entity system 200, and/or any other applications that are required by the entity device to perform one or operations. It should be understood that the memory component 575 may include one or more databases or other data structures/repositories. The memory component 575 also includes computer-executable program code that instructs the processor 515 to operate the network communication interface 510 to perform certain communication functions of the entity device 500 described herein and also instructs the processor 515 to cause the control system 535 to perform certain actions of the entity device 500 including, but not limited to, dispensing standard resources, dispensing special resources, accepting standard resources, accepting special resources, accepting resource distribution cards (e.g., credit card, debit card, or the like), or the like. Based on the instructions and control signals received from the entity device transformation system 300 via network communication interface and the entity device transformation application 560, the processor 515 via the control system 535 may cause the printing system 520, the camera 525, the sensor 530, the control system 535, the standard resource storage module 540, the special resource storage module 545, the standard resource dispenser 550, the special resource dispenser 555 to perform certain action described herein.

In some preferred embodiments, the computer-executable program code may instruct the processor 515 to process special interaction requests (e.g., request for a cashier's check) and generate special resources (e.g., cashier's check), via the printing system 520, the control system 535, the special resource storage module 545, the special resource dispenser 555, or the like. In some embodiments, the computer-executable program code may instruct the processor 515 to process interaction requests (e.g., change orders) and dispense change (e.g., coins), via the control system 535, the special resource storage module 545, the special resource dispenser 555, or the like.

In some embodiments, the entity device 500 may function as a regular entity device which allows users to perform standard interactions (e.g., cash transactions) that are associated with standard resources (e.g., cash), where the entity device 500 dispenses and/or accepts standard resources to the one or more users. In some embodiments, the entity device 500 may be transformed by the system of the present invention into a multi-functional device that is configured to facilitate interactions associated with special resources (e.g., cashier's check, money order, coins, foreign currency, or the like). In such embodiments, the system may transmit a network package via the entity device transformation application 560 and the network communication interface 510. In some embodiments, the system may generate a scannable code and may display the scannable code on the entity device 500 for performing interactions associated with special resources. In response to receiving the scannable code from the associate device 201 of the associate 202, the system activates the entity device and transforms the entity device 500 to a multifunctional device configured to process interactions associated with special resources.

Figure 6:
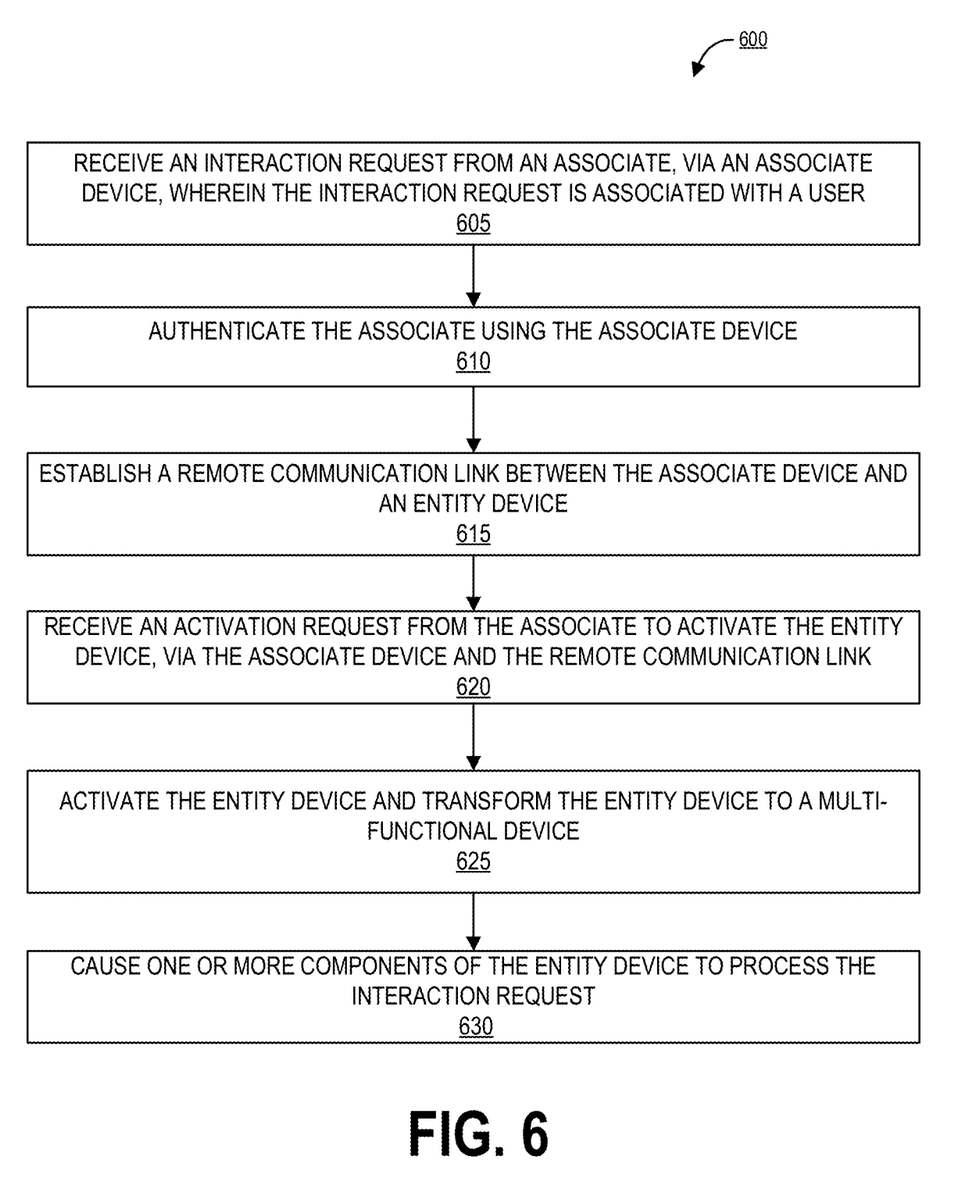
FIG. 6 provides a block diagram illustrating a process flow for transforming entity device to a multi-functional device via a remote communication link, in accordance with an embodiment of the invention.

FIG. 6 provides a block diagram illustrating a process flow 600 for transforming entity device to a multi-functional device via a remote communication link, in accordance with an embodiment of the invention. In some embodiments, the process flow 600 may be initiated after detecting presence of one or more users at an entity location (e.g., financial centers) comprising one or more entity devices (e.g., Automated Teller Machines). In some embodiments, one or more associates may be waiting at the one or more entity devices to take interaction requests from the one or more users. In some embodiments, instead of the associates waiting at the one or more entity devices, the system may determine a type of interaction the one or more users wants to perform (e.g., by communicating with the user via the one or more entity devices, via an entity application). The system may then determine whether associate assistance is required for the type of interaction the one or more users want to perform. In an embodiment, if a user wants to perform an interaction associated with standard resources (e.g., cash), the system may direct the user to an entity device of the one or more entity devices. In another embodiment, if a user wants to perform an interaction associated with special resources (e.g., cashier's check, money order, coins, foreign currency, or the like), the system may transmit a notification to an associate (e.g., a teller, financial analyst, or the like) via an associate device (e.g., a wireless mobile, a wireless tablet, or the like). Upon receiving the notification, the associate may communicate with the user to help the user out to perform the interaction associated with the special resources. In some embodiments, the communication between the associate and the user may be a face-to-face communication. In some embodiments, the communication between the associate and the user may be via an entity application (e.g., online banking application) provided by the entity. In some embodiments, the communication between the associate and the user may be via the one or more entity devices present at the entity location. In some embodiments, when the associate communicates with the user, the associate may authenticate the user.

As shown in block 605, the system receives an interaction request from an associate, via an associate device, wherein the interaction request is associated with a user. As explained above, in the case where the interaction is associated with special resources, the associate may gather information associated with the interaction from the user and may initiate the interaction request, via the associate device. In some embodiments, the associate may input one or more details associated with the interaction (e.g., type of special resources associated with the interaction, amount associated with the interaction, mode of payment associated with the interaction, or the like) into an application provided by the system of the present invention on the associate device of the associate.

As shown in block 610, the system authenticates the associate using the associate device. In response to receiving the interaction request, the system may authenticate the associate using any of the standard authentication methods via the associate device (e.g., biometric authentication, facial recognition, or the like).

As shown in block 615, the system establishes a remote communication link between the associate device and an entity device. After successful authentication, the system may select an entity device of the one or more entity devices for processing the interaction request and may transmit a notification to direct the user and/or the associate to a certain entity device (e.g., ATM '1') of the one or more entity devices (e.g., ATM '1,' ATM '2,' through ATM 'N') present at the entity location to perform the interaction. In alternate embodiments, the associate may scan a scannable code displayed on an entity device by the system of the present invention, via the associate device. In some other embodiments, the system may determine that the associate within proximity of an entity device and may select the entity device for the interaction. In some embodiments where the associate is not physically present at the entity device, the system may allow the associate to select an entity device from the one or more entity device remotely and may then direct the user to go to the selected entity device. The system after selecting an entity device, establishes a remote communication link between the associate device and the selected entity device.

As shown in block 620, the system receives an activation request from the associate to activate the entity device, via the associate device and the remote communication link. In some embodiments, the system may present a single click functionality on an associate device to allow the associate to initiate the activation request to activate an entity device. For example, the system may select an icon presented by the system on an interface of an entity device transformation application located on the associated device of the associate to activate the entity device.

As shown in block 625, the system activates the entity device and transform the entity device to a multi-functional device. In some embodiments, the system may transmit a network packet to the entity device to transform the entity device to a multi-functional device that is capable of performing interactions that may otherwise require a user to go to multiple associates and/or interact with multiple systems at the entity location.

As shown in block 630, the system cause one or more components of the entity device to process the interaction request. In some embodiments, the network packet may cause a control system of an entity device (e.g., control system 535) to physically transform and/or activate one or more components (e.g., that may be dormant) to perform the interaction associated with special resources. For example, an entity device may typically be performing cash transactions via standard resource dispenser 550 (e.g., normal cash dispensing slots) and upon receiving the network packet, the instructions in the network packet may cause the control system 535 to inactivate the standard resource dispenser 550 and to activate the special resource dispenser 555. In some cases, inactivation may cause the standard resource dispenser 550 to not be visible to the user. The system may cause the control system 535 to activate the special resource dispenser 555 to dispense special resources (e.g., foreign currency) from the special resource storage module 545 (e.g., foreign currency storage module). In some embodiments, the system may further cause the control system 535 to activate the printing system 520 to print on the special resources that are extracted from the special resource storage module 545 (e.g., printing a cashier's check) and then dispense the modified special resources via the special resource dispenser 555.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| U.S. Patent Application Ser. No. | Title | Filed On |
|---|---|---|
| 17/398,401 | REMOTE DEVICE LINKAGE FOR SECURE COMMUNICATIONS | Concurrently herewith |
| 17/398,447 | MODULAR DEVICE MESH NETWORK FOR ASSOCIATED DEVICE INTEGRATION | Concurrently herewith |

What is claimed is:

1. A system for transforming an entity device to a multi-functional device via a remote communication link, the system comprising:
   a memory device with computer-readable program code stored thereon;
   a communication device; and
   a processing device operatively coupled to the memory device and the communication device, wherein the processing device is configured to execute the computer-readable program code to:
      receive an interaction request from an associate, via an associate device,
   wherein the interaction request is associated with a user;
      authenticate the associate using the associate device;
      in response to authenticating the associate, establish a remote communication link between the associate device and the entity device;
      receive an activation request from the associate to activate the entity device, via the associate device and the remote communication link;
      in response to receiving the activation request, activate the entity device and cause the entity device to physically transform to the multi-functional device capable of receiving or disbursing special resources, wherein the special resources comprise coins, cashier's check, and foreign currency;
      cause a control system of the entity device to activate a special resource storage module of the entity device and extract the special resources associated with the interaction request from the special resource storage module; and
      cause the control system of the entity device to activate a special resource dispenser of the entity device to dispense the special resources extracted from the special resource storage module associated with the interaction request.

2. The system according to claim 1, wherein the processing device is configured to execute the computer-readable program code to transform the entity device to the multi-functional device to process the interaction request.

3. The system according to claim 2, wherein the interaction request is associated with the disbursement of the special resources.

4. The system of claim 1, wherein the processing device is further configured to execute the computer-readable program code to:
cause the control system of the entity device to activate a printing module of the entity device to perform a printing operation on the special resources extracted from the special resource storage module.

5. The system according to claim 1, wherein the processing device is further configured to execute the computer-readable program code to:
generate a scannable code and display the scannable code on the entity device, wherein the scannable code allows the user to initiate the establishment of the remote communication link between the associate device and the entity device.

6. The system according to claim 1, wherein the processing device is further configured to execute the computer-readable program code to activate the entity device and transform the entity device to the multi-functional device by transmitting a network packet to the entity device.

7. A computer program product for transforming an entity device to a multi-functional device via a remote communication link, the computer program product comprising at least one non-transitory computer readable medium having computer-readable program code portions embodied therein, the computer-readable program code portions comprising executable portions for:
receiving an interaction request from an associate, via an associate device, wherein the interaction request is associated with a user;
authenticating the associate using the associate device;
in response to authenticating the associate, establishing a remote communication link between the associate device and the entity device;
receiving an activation request from the associate to activate the entity device, via the associate device and the remote communication link;
in response to receiving the activation request, activating the entity device and causing the entity device to physically transform to the multi-functional device capable of receiving or disbursing special resources, wherein the special resources comprise coins, cashier's check, and foreign currency,
causing a control system of the entity device to activate a special resource storage module of the entity device and extract the special resources associated with the interaction request from the special resource storage module; and
causing the control system of the entity device to activate a special resource dispenser of the entity device to dispense the special resources extracted from the special resource storage module associated with the interaction request.

8. The computer program product of claim 7, wherein the computer-readable program code portions comprising executable portions for transforming the entity device to the multi-functional device to process the interaction request.

9. The computer program product of claim 8, wherein the interaction request is associated with the disbursement of the special resources.

10. The computer program product of claim 7, wherein the computer-readable program code portions comprising executable portions for causing the control system of the entity device to activate a printing module of the entity device to perform a printing operation on the special resources extracted from the special resource storage module.

11. The computer program product of claim 7, wherein the computer-readable program code portions comprising executable portions for activating the entity device and transforming the entity device to the multi-functional device by transmitting a network packet to the entity device.

12. A computer-implemented method for transforming an entity device to a multi-functional device via a remote communication link, the method comprising:
receiving an interaction request from an associate, via an associate device, wherein the interaction request is associated with a user;
authenticating the associate using the associate device;
in response to authenticating the associate, establishing a remote communication link between the associate device and the entity device;
receiving an activation request from the associate to activate the entity device, via the associate device and the remote communication link;
in response to receiving the activation request, activating the entity device and causing the entity device to physically transform to the multi-functional device capable of receiving or disbursing special resources, wherein the special resources comprise coins, cashier's check, and foreign currency, causing a control system of the entity device to activate a special resource storage module of the entity device and extract the special resources associated with the interaction request from the special resource storage module; and
causing the control system of the entity device to activate a special resource dispenser of the entity device to dispense the special resources extracted from the special resource storage module associated with the interaction request.

13. The computer-implemented method of claim 12, wherein the method further comprises transforming the entity device to the multi-functional device to process the interaction request.

14. The computer-implemented method of claim 13, wherein the interaction request is associated with the disbursement of the special resources.

15. The computer-implemented method of claim 12, wherein the method further comprises causing the control system of the entity device to activate a printing module of the entity device to perform a printing operation on the special resources extracted from the special resource storage module.

16. The computer-implemented method of claim 12, wherein the method further comprises generating a scannable code and displaying the scannable code on the entity device, wherein the scannable code allows the user to initiate the establishment of the remote communication link between the associate device and the entity device.

17. The computer-implemented method of claim 12, wherein activating the entity device and transforming the entity device to the multi-functional device is based on transmitting a network packet to the entity device.

* * * * *